US011917393B2

(12) United States Patent
Watanabe et al.

(10) Patent No.: US 11,917,393 B2
(45) Date of Patent: Feb. 27, 2024

(54) SOUND FIELD SUPPORT METHOD, SOUND FIELD SUPPORT APPARATUS AND A NON-TRANSITORY COMPUTER-READABLE STORAGE MEDIUM STORING A PROGRAM

(71) Applicant: YAMAHA CORPORATION, Hamamatsu (JP)

(72) Inventors: Takayuki Watanabe, Hamamatsu (JP); Dai Hashimoto, Hamamatsu (JP); Hiroomi Shidoji, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 176 days.

(21) Appl. No.: 17/695,907

(22) Filed: Mar. 16, 2022

(65) Prior Publication Data

US 2022/0303709 A1 Sep. 22, 2022

(30) Foreign Application Priority Data

Mar. 19, 2021 (JP) ................................ 2021-045543

(51) Int. Cl.
*H04S 7/00* (2006.01)
*H04R 3/12* (2006.01)

(52) U.S. Cl.
CPC ............... *H04S 7/303* (2013.01); *H04R 3/12* (2013.01); *H04S 7/301* (2013.01); *H04S 2400/01* (2013.01); *H04S 2420/01* (2013.01)

(58) Field of Classification Search
None
See application file for complete search history.

(56) References Cited

U.S. PATENT DOCUMENTS 10,158,964 B2 * 12/2018 Oh .......................... H04S 7/303
2016/0266865 A1 9/2016 Tsingos et al.

FOREIGN PATENT DOCUMENTS

JP 2017184174 A 10/2017

OTHER PUBLICATIONS

1 Extended European search report issued in European Appln. No. 22162878.7 dated Aug. 29, 2022.

* cited by examiner

*Primary Examiner* — Kenny H Truong
(74) *Attorney, Agent, or Firm* — ROSSI, KIMMS & McDOWELL LLP

(57) ABSTRACT

A sound field support method for an audio reproducing apparatus for simulating sound emitting from a sound source, the method includes selecting either position information on the sound source to be set in a virtual space or localization information of the sound source, in a case where sound from the sound source is to be simulated sound emitted from a speaker to be set in a target space, generating a first sound signal based on the position information in a state where the selecting has selected the position information, generating a second sound signal based on the localization information in a state where the selecting has selected the localization information, and adjusting sound image localization of an input audio signal from the sound source to be output to the speaker using the first sound signal and the second sound signal.

11 Claims, 12 Drawing Sheets

SOUND FIELD SUPPORT METHOD, SOUND FIELD SUPPORT APPARATUS AND A NON-TRANSITORY COMPUTER-READABLE STORAGE MEDIUM STORING A PROGRAM

CROSS REFERENCE TO RELATED APPLICATIONS

This Nonprovisional application claims priority under 35 U.S.C. § 119(a) on Patent Application No. 2021-045543 filed in Japan on Mar. 19, 2021, the entire contents of which are hereby incorporated by reference.

BACKGROUND

Technical Field

An embodiment of the present disclosure relates to a sound field support method and a sound field support apparatus that perform processing to simulate a sound field by a sound source set in a virtual space, in a target space in which a speaker is disposed.

Background Information

Various technologies to simulate a sound of a sound source set in a virtual space, in a real space, are devised.

For example, a simulation system disclosed in Japanese Unexamined Patent Application Publication No. 2017-184174 sets a position of a plurality of virtual speakers so as to maintain and follow a relative positional relationship with an audience in a virtual space, in accordance with a change of a position of the audience. Furthermore, the simulation system disclosed in Japanese Unexamined Patent Application Publication No. 2017-184174 sets a volume balance of a plurality of virtual speakers.

The simulation system disclosed in Japanese Unexamined Patent Application Publication No. 2017-184174 executes sound processing using the plurality of virtual speakers, based on these settings.

However, in a case in which a sound set by use of a virtual sound source (the virtual speaker disclosed in Japanese Unexamined Patent Application Publication No. 2017-184174) is emitted in a target space, this sound is emitted by a speaker disposed in the target space and having an assigned virtual sound source. In other words, the sound to be emitted in the target space is a sound obtained by simulating a sound of the virtual sound source by the sound of the speaker disposed in the target space.

Conventionally, the sound from the virtual sound source has not been able to be compared with the sound (a simulated reproduction sound) to be reproduced in a simulated manner by the speaker in the target space. Therefore, the audience has not been able to check how well the sound from the virtual sound source is simulated by the simulated reproduction sound and easily make adjustment.

SUMMARY

In view of the foregoing, an object of an embodiment of the present disclosure is to allow comparison between a sound of a virtual sound source and a simulated reproduction sound.

A sound field support method for an audio reproducing apparatus for simulating sound emitting from a sound source, the method includes selecting either position information on the sound source to be set in a virtual space or localization information of the sound source, in a case where sound from the sound source is to be simulated by sound emitted from a speaker to be set in a target space, generating a first sound signal based on the position information in a state where the selecting has selected the position information, generating a second sound signal based on the localization information in a state where the selecting has selected the localization information, and adjusting sound image localization of an input audio signal from the sound source to be output to the speaker using the first sound signal and the second sound signal.

A sound field support method allows an audience to compare a sound of a virtual sound source with a simulated reproduction sound.

DETAILED DESCRIPTION

A sound field support method and a sound field support apparatus according to an embodiment of the present disclosure will be described with reference to the drawings.

In the embodiment of the present disclosure, a target space is a space in which an audience uses a speaker or the like, and actually listens to a sound of a sound source set in a virtual space. It is to be noted that, more specifically, in the sound field support method according to the embodiment of the present disclosure, a target space does not mean a space in which a speaker is actually disposed, but means a space in which a speaker is disposed and an audience is to listen to a sound from this speaker. A virtual space is a space in which a sound source desired to be simulated in a target space is set.

First Embodiment

Figure 1:
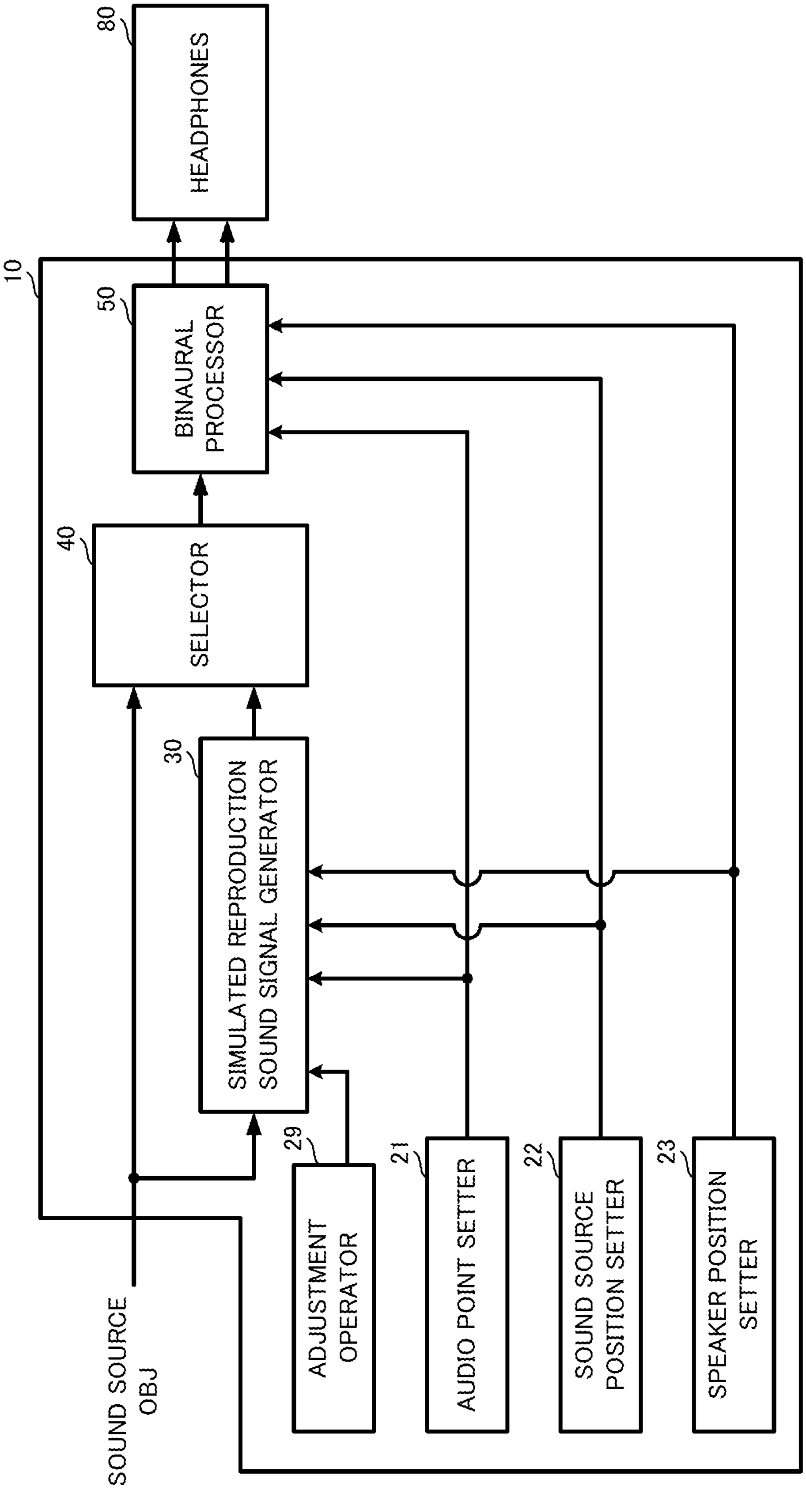
FIG. 1 is a functional block diagram showing a configuration of a sound field support system including a sound field support apparatus according to a first embodiment of the present disclosure.
Figure 2A:
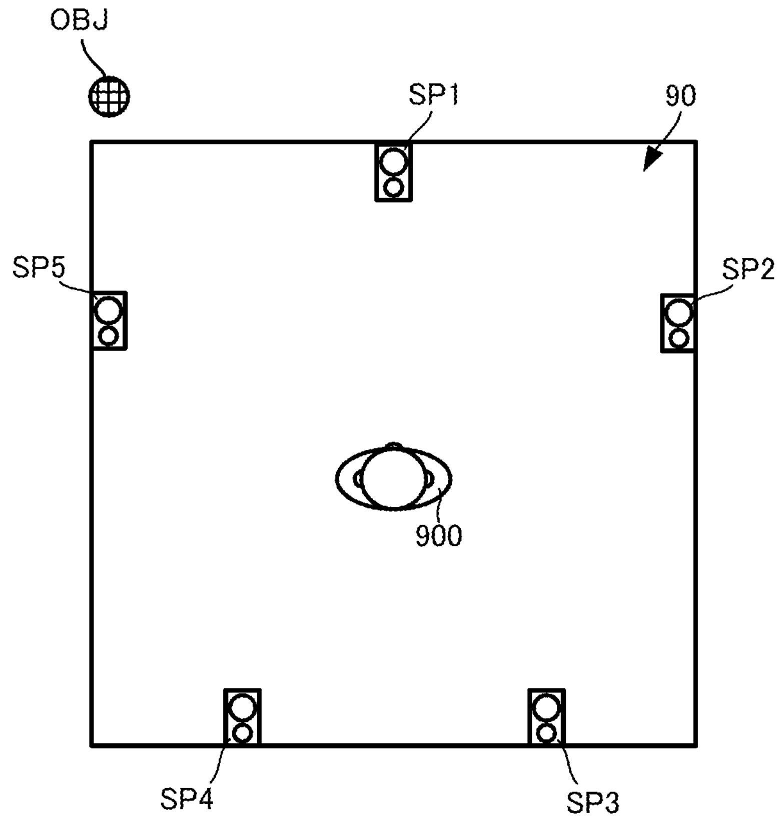
FIG. 2A is a view showing an example of a positional relationship among a sound source, an audience point, and a plurality of speakers in a sound field support method according to the first embodiment of the present disclosure.
Figure 2B:
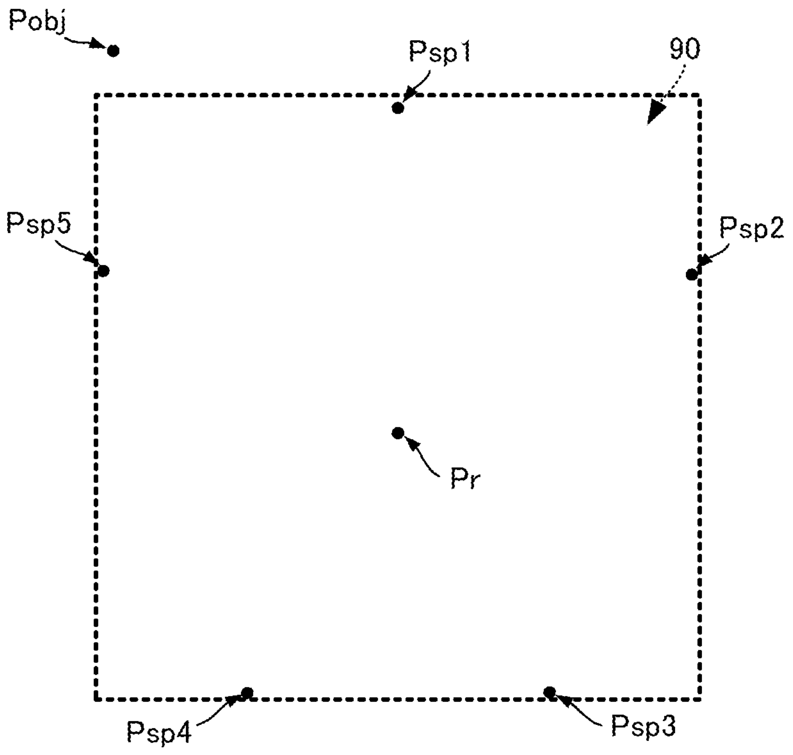
FIG. 2B is a view showing a position coordinate of the sound source, a position coordinate of the audience point, and a position coordinate of the plurality of speakers, in a case of FIG. 2A.
Figure 3A:
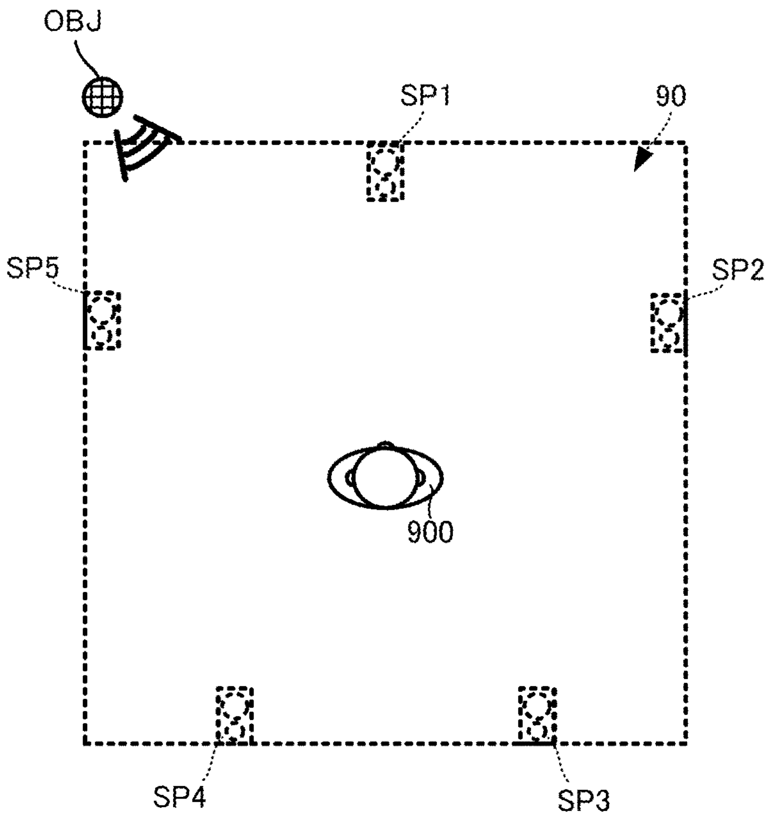
FIG. 3A is a view showing an image of emitting a sound from a sound source.
Figure 3B:
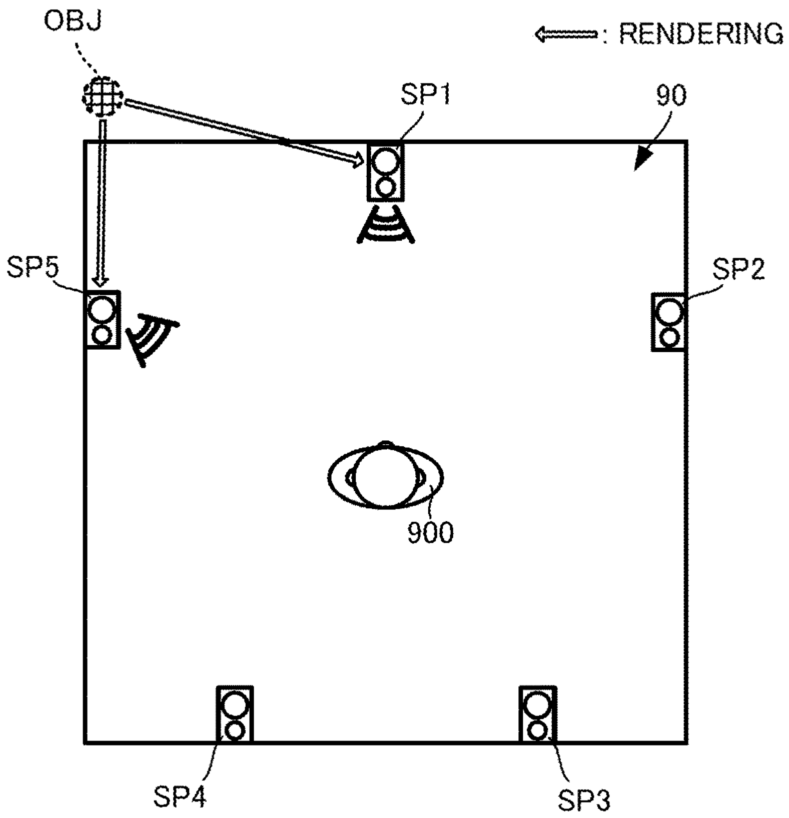
FIG. 3B is a view showing an image of rendering a sound source to a speaker and emitting a sound.

FIG. 1 is a functional block diagram showing a configuration of a sound field support system including a sound field support apparatus according to a first embodiment of the present disclosure. FIG. 2A is a view showing an example of a positional relationship among a sound source, an audience point, and a plurality of speakers in a sound field support method according to the first embodiment of the present disclosure, and FIG. 2B is a view showing a position coordinate of the sound source, a position coordinate of the audience point, and a position coordinate of the plurality of speakers, in a case of FIG. 2A. FIG. 3A is a view showing an image of emitting a sound from a sound source, and FIG. 3B is a view showing an image of rendering a sound source to a speaker and emitting a sound.

As shown in FIG. 2A, an audience point 900 at which an audience watches and listens to, and a plurality of speakers SP1 to SP5 are disposed in a target space 90. A virtual space is set in this target space 90. A sound source OBJ is set in the virtual space.

It is to be noted that, while the description of the present embodiment shows one sound source, the number of sound sources may be two or more. In a case in which the number of sound sources is two or more, the sound field support method to be described below may be applied for each of a plurality of sound sources. Alternatively, the sound field support method to be described below may be applied to the plurality of sound sources all at once. It is to be noted that the present embodiment shows a case of one sound source. In addition, while the description of the present embodiment of the present disclosure shows five speakers, the number of speakers is not limited to five.

A coordinate system of the target space 90 and a coordinate system of the virtual space are set so that a direction and a center point of three orthogonal axes may coincide, for example. In this case, the position coordinate by the coordinate system in the target space 90 and the position coordinate by the coordinate system of the virtual space coincide with each other. It is to be noted that, even when the coordinate system of the target space 90 and the coordinate system of the virtual space do not coincide with each other, a coordinate transformation matrix between the target space 90 and the virtual space may be set in this case.

As shown in FIG. 1, a sound field support system includes a sound field support apparatus 10 and headphones 80. The sound field support apparatus 10 includes an audience point setter 21, a sound source position setter 22, a speaker position setter 23, an adjustment operator 29, a simulated reproduction sound signal generator 30, a selector 40, and a binaural processor 50. The sound field support apparatus 10 is achieved by a program that executes each above functioner, a storage medium that stores this program, and an arithmetic processing apparatus such as a CPU or the like that executes this program.

The audience point setter 21 sets a position coordinate Pr of the audience point 900 in the target space 90. The audience point setter 21 outputs the position coordinate Pr of the audience point 900 to the simulated reproduction sound signal generator 30 and the binaural processor 50.

The sound source position setter 22 sets a position coordinate (more specifically, a position coordinate obtained by projecting a sound source in a virtual space onto the target space 90) Pobj of a sound source OBJ in the virtual space. The sound source position setter 22 outputs the position coordinate Pobj of the sound source OBJ to the simulated reproduction sound signal generator 30 and the binaural processor 50.

The speaker position setter 23 sets position coordinates Psp1 to Psp5 of the plurality of speakers SP1 to SP5 in the target space 90. The speaker position setter 23 outputs the position coordinates Psp1 to Psp5 of the plurality of speakers SP1 to SP5 to the simulated reproduction sound signal generator 30 and the binaural processor 50.

The adjustment operator 29 receives an operation input of a parameter for adjustment. The adjustment operator 29 outputs the parameter for adjustment to the simulated reproduction sound signal generator 30.

The simulated reproduction sound signal generator 30 generates a simulated reproduction sound signal to be outputted to the speakers SP1 to SP5 of the target space 90, from an object reproduction sound signal.

Herein, the object reproduction sound signal is an audio signal to be outputted from the sound source OBJ. The simulated reproduction sound signal is an audio signal to perform sound image localization of the sound source OBJ by the speaker rendering the sound source OBJ.

More specifically, the simulated reproduction sound signal generator 30 calculates the positional relationship between the position coordinate Pobj of the sound source OBJ, and the position coordinate Psp1 to Psp5 of the plurality of speakers SP1 to SP5 with reference to the position coordinate Pr of the audience point 900. The simulated reproduction sound signal generator 30 sets sound image localization information on the sound source OBJ by use of this positional relationship. The sound image localization information is information that sets as if a sound is emitted from the sound source OBJ in the audience point 900 by the sound that the plurality of speakers SP1 to SP5 output. The sound image localization information is information to determine a volume of an output sound from the plurality of speakers SP1 to SP5, and output timing.

The simulated reproduction sound signal generator 30 sets a plurality of speakers that render the sound source OBJ by use of the sound image localization information of the sound source OBJ (see FIG. 3B). The simulated reproduction sound signal generator 30 generates the simulated reproduction sound signal to be reproduced by the plurality of speakers in which the sound source OBJ is rendered. The simulated reproduction sound signal generator 30 outputs the simulated reproduction sound signal to the selector 40.

The selector 40 receives the operation input from an audience or the like, and selects the object reproduction sound signal and the simulated reproduction sound signal. More specifically, when a setting (a state of FIG. 3A) in which a sound directly outputted from the sound source OBJ set in the virtual space is listened to is selected, the selector 40 selects and outputs the object reproduction sound signal. On the other hand, when a setting (a state of FIG. 3B) in which a sound from a plurality of rendered speakers is listened to is selected, the selector 40 selects and outputs the simulated reproduction sound signal. In other words, when the position information on the sound source OBJ is selected, the object reproduction sound signal is selected and outputted, and when the localization information on the sound source OBJ using a speaker is selected, the simulated reproduction sound signal is selected and outputted.

The selector 40 outputs a selected audio signal to the binaural processor 50.

The binaural processor 50 performs binaural processing on an audio signal selected by the selector 40. It is to be noted that the binaural processing uses a head-related transfer function, and detailed content is known. A detailed description of the binaural processing will be omitted.

More specifically, in a case in which the selector 40 selects the object reproduction sound signal, the binaural processor 50 performs the binaural processing on an audio signal of the sound source OBJ by use of the position coordinate Pobj of the sound source OBJ and the position coordinate Pr of the audience point 900. In a case in which the selector 40 selects the simulated reproduction sound signal, the binaural processor 50 performs the binaural processing on the simulated reproduction sound signal by use of the position coordinate Psp of a speaker SP in which the sound source OBJ is rendered and the position coordinate Pr of the audience point 900.

For example, as shown in FIG. 2A, FIG. 2B, FIG. 3A, and FIG. 3B, in a case in which the selector 40 selects the object reproduction sound signal, the binaural processor 50 performs the binaural processing on the object reproduction sound signal by use of the position coordinate Pobj of the sound source OBJ and the position coordinate Pr of the audience point 900. In a case in which the selector 40 selects the simulated reproduction sound signal, the binaural processor 50 performs the binaural processing on the simulated reproduction sound signal by use of the position coordinates Psp1 and Psp5 of the speakers SP1 and SP5 in which the sound source OBJ is rendered and the position coordinate Pr of the audience point 900.

The binaural processor 50 outputs the audio signal (a binaural signal) on which the binaural processing has been performed, to the headphones 80.

The headphones 80 reproduce the audio signal by the binaural signal and emits a sound. It is to be noted that, while the present embodiment shows a mode in which a sound is emitted by use of the headphones 80, a sound may be emitted by use of a stereo speaker of two channels.

By such a configuration, in a case in which the object reproduction sound signal is selected, the audience can listen to a sound (an object reproduction sound) of which the sound source is localized at a position of the sound source OBJ, through the headphones 80. On the other hand, in a case in which the simulated reproduction sound signal is selected, the audience can listen to the sound (the simulated reproduction sound) of which the sound source is localized in a simulated manner at the position of the sound source OBJ by the speaker to which the sound source OBJ is rendered, through headphones.

As a result, the audience, without actually placing a speaker in a real space, can compare and listen to the object reproduction sound and the simulated reproduction sound. Therefore, the audience can directly and physically experience a difference between the object reproduction sound and the simulated reproduction sound. As a result, the audience can determine whether the simulated reproduction sound is able to reproduce (simulate) the object reproduction sound with good accuracy, or no discomfort between the object reproduction sound and the simulated reproduction sound is caused.

In addition, the audience refers to such a physical experience result, and can adjust the parameter for adjustment of the simulated reproduction sound signal. Then, the audience can reproduce the object reproduction sound with good accuracy with the simulated reproduction sound by repeating adjustment of such a parameter.

It is to be noted that, in order to reproduce the sound of the sound source OBJ with good accuracy, a mode in which the simulated reproduction sound signal is adjusted is shown herein. However, for example, in a case in which a change in the position of the speaker in the target space 90 and a change in the setting of the parameter are difficult and the position setting of the sound source OBJ is able to be changed, the audience listens to the sound on which the binaural processing has been performed, changes the setting of the sound source OBJ and can achieve a desired sound field.

(Sound Field Support Method 1 of First Embodiment)

Figure 4:
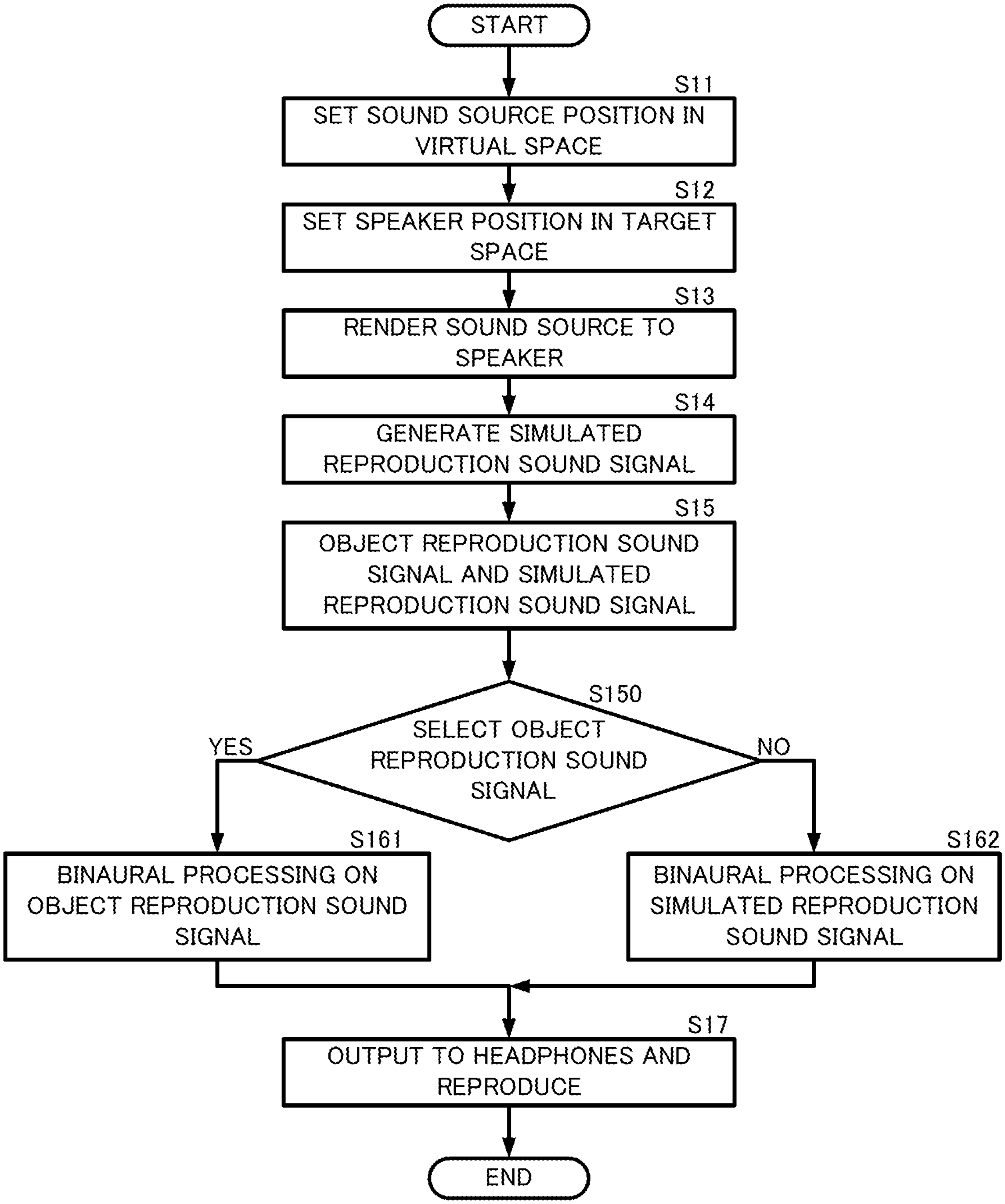
FIG. 4 is a flow chart showing a first method of the sound field support method according to the first embodiment of the present disclosure.

FIG. 4 is a flow chart showing a first method of the sound field support method according to the first embodiment of the present disclosure. The sound field support method shown in FIG. 4 is executed until an audio signal on which the binaural processing has been performed is outputted. It is to be noted that, since the detailed description in each processing shown in FIG. 4 is stated above, the following detailed description will be omitted. In addition, hereinafter, a case of the placement mode shown in FIG. 2A, FIG. 2B, FIG. 3A, and FIG. 3B will be described as an example.

The sound source position setter 22 sets a position of the sound source OBJ in the virtual space (S11). The speaker position setter 23 sets positions of the speakers SP1 to SP5 in the target space (S12).

The simulated reproduction sound signal generator 30 renders the sound source OBJ to the speakers SP1 and SP5 by use of the position coordinate Pobj of the sound source OBJ, the position coordinates Psp1 to Psp5 of the speakers SP1 to SP5, the position coordinate Pr of the audience point 900 (S13). The simulated reproduction sound signal generator 30 generates a simulated reproduction sound signal by use of a rendering result (S14).

The selector 40 selects the object reproduction sound signal and the simulated reproduction sound signal by an operation from an audience or the like (S15). For example, the sound field support apparatus 10 includes a GUI (Graphical User Interface). The GUI includes a physical controller that selects an audio signal to be reproduced. When an audience selects an output of the object reproduction sound signal, the selector 40 selects the object reproduction sound signal (YES in S150). When an audience selects an output of the simulated reproduction sound signal, the selector 40 selects the simulated reproduction sound signal (NO in S150). It is to be noted that a switching time may be set for a selection of the object reproduction sound signal and the simulated reproduction sound signal and the selection is also able to be automatically switched according to the switching time.

The binaural processor 50 performs the binaural processing on a selected audio signal, and generates a binaural signal. More specifically, when the object reproduction sound signal is selected, the binaural processor 50 performs the binaural processing on the object reproduction sound signal, and generates a binaural signal of the object reproduction sound signal (S161). When the simulated reproduction sound signal is selected, the binaural processor 50 performs the binaural processing on the simulated reproduction sound signal, and generates a binaural signal of the simulated reproduction sound signal (S162).

The headphones 80 reproduce the binaural signal (S17). More specifically, the headphones 80 reproduce this binaural signal when the binaural signal of the object reproduction sound signal is inputted. The headphones 80 reproduce this binaural signal when the binaural signal of the simulated reproduction sound signal is inputted.

By performing such processing, the sound field support method is able to selectively provide an audience or the like with the object reproduction sound and the simulated reproduction sound.

(Sound Field Support Method 2 of First Embodiment)

Figure 5:
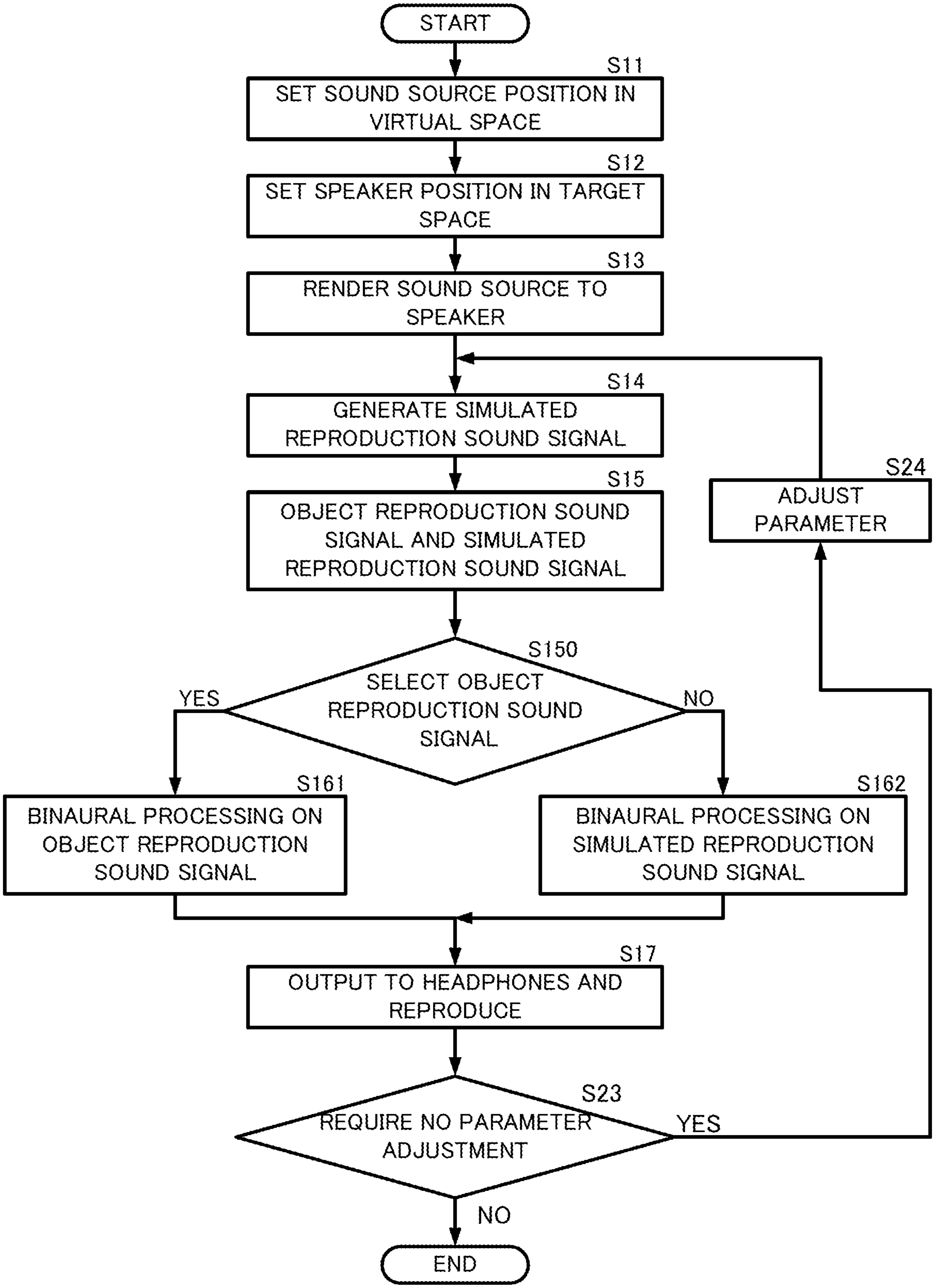
FIG. 5 is a flow chart showing a second method of the sound field support method according to the first embodiment of the present disclosure.

FIG. 5 is a flow chart showing a second method of the sound field support method according to the first embodiment of the present disclosure. The sound field support method shown in FIG. 5 adds parameter adjustment to the sound field support method shown in FIG. 4. It is to be noted that a description of processing that is the same as the processing shown in FIG. 4 in processing shown in FIG. 5 will be omitted. In addition, hereinafter, a case of the placement mode shown in FIG. 2A, FIG. 2B, FIG. 3A, and FIG. 3B will be described as an example.

The sound field support method shown in FIG. 5 executes the same processing up to Step S17 as the sound field support method shown in FIG. 4.

An audience executes processing from Step S15 to Step S17 and switches an audio signal to be reproduced. As a result, the audience listens to a sound of the binaural signal of the object reproduction sound signal and a sound of the binaural signal of the simulated reproduction sound signal, and compares the sounds.

When the parameter adjustment is not required (NO in S23), that is, when the sound by the binaural signal of the simulated reproduction sound signal is able to reproduce the sound by the binaural signal of the object reproduction sound signal with good accuracy, the processing ends. When the parameter adjustment is required (YES in S23), the audience performs the parameter adjustment by use of the adjustment operator 29 (S24). The simulated reproduction sound signal generator 30 generates a simulated reproduction sound signal by use of an adjusted parameter (S14).

Figure 6:
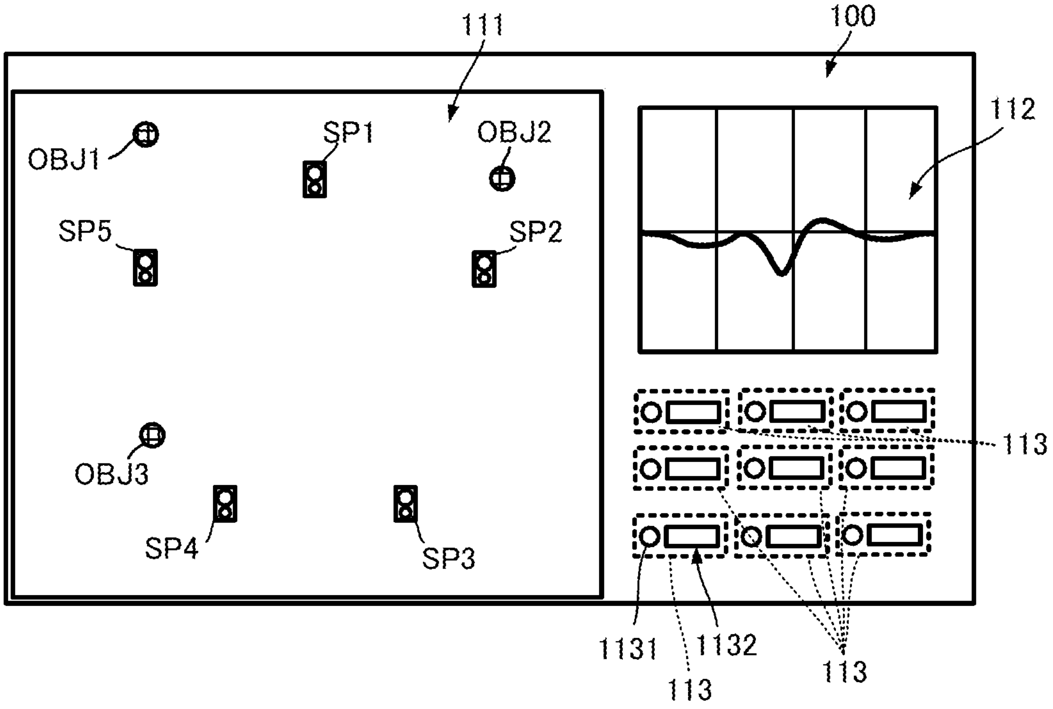
FIG. 6 is a view showing an example of a GUI for parameter adjustment.

It is to be noted that parameters to be adjusted include a rendering setting of a sound source OBJ and a speaker, a volume level of a simulated reproduction sound signal, and frequency characteristics, for example. FIG. 6 is a view showing an example of a GUI for the parameter adjustment. As shown in FIG. 6, a GUI 100 includes a positional relationship check window 111, a waveform check window 112, and a plurality of physical controllers 113. Each of the plurality of physical controllers 113 includes a knob 1131 and an adjustment value display window 1132.

The positional relationship check window 111 displays sound sources OBJ1 to OBJ3 and the plurality of speakers SP1 to SP5 by the position coordinate set for each. The setting of a speaker SP to be assigned to the sound source OBJ is able to be achieved by a selection of the sound source OBJ and the speaker SP to be rendered, for example in the positional relationship check window 111.

The waveform check window 112 displays a waveform of a simulated reproduction sound signal. A selection of the simulated reproduction sound signal to be displayed is switched, for example, by a selection of the plurality of speakers SP1 to SP5 displayed on the positional relationship check window 111.

The plurality of physical controllers 113 are physical controllers that receive Q of the simulated reproduction sound signal, a setting of filter processing, a setting of gain value, or the like for each of a plurality of frequency bands (Hi, Mid, Low), for example. The knob 1131 receives an operation from an audience. The adjustment value display window 1132 displays a numerical value set by the knob 1131. The parameter of the simulated reproduction sound signal is adjusted by an operation input through the plurality of physical controllers 113. Then, a waveform with this adjusted parameter is displayed on the waveform check window 112.

The audience can adjust and set a parameter by operating while looking at this GUI 100.

Subsequently, the audience performs parameter adjustment by listening to and comparing the sound by the binaural signal of the object reproduction sound signal and the sound by the binaural signal of the simulated reproduction sound signal. As a result, the audience can adjust the sound by the binaural signal of the simulated reproduction sound signal so as to reproduce the sound by the binaural signal of the object reproduction sound signal with good accuracy. In other words, the audience can adjust the simulated reproduction sound by a speaker to simulate the object reproduction sound of the sound source OBJ with good accuracy. It is to be noted that a comparer and outputter of the object reproduction sound and the simulated reproduction sound, and the adjustment operator 29 implement an "adjuster" of the present disclosure.

Moreover, the sound field support apparatus 10 and the sound field support method according to the embodiment of the present disclosure show a mode in which a comparison is performed between the object reproduction sound and the simulated reproduction sound by binaural reproduction. However, the sound field support apparatus 10 and the sound field support method according to the embodiment of the present disclosure are able to perform parameter adjustment, for example, by comparing the waveform or frequency spectrum, and HOA (Higher-Order Ambisonics) of an object reproduction sound signal with the waveform or frequency spectrum, and HOA (Higher-Order Ambisonics) of a simulated reproduction sound signal.

Second Embodiment

A sound field support apparatus and a sound field support method according to a second embodiment of the present disclosure will be described with reference to the drawings.

Figure 7:
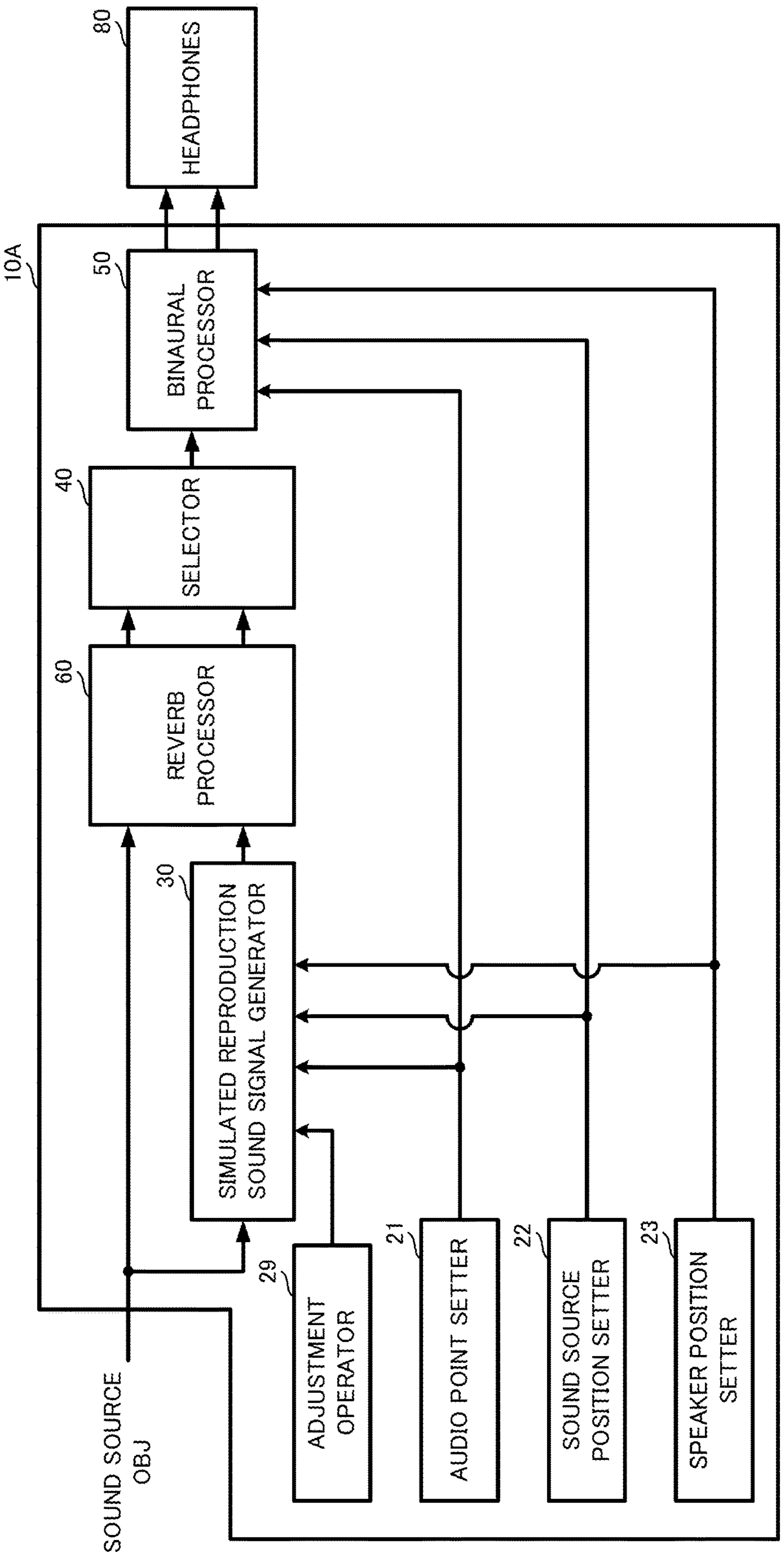
FIG. 7 is a functional block diagram showing a configuration of a sound field support system including a sound field support apparatus according to a second embodiment of the present disclosure.
Figure 8:
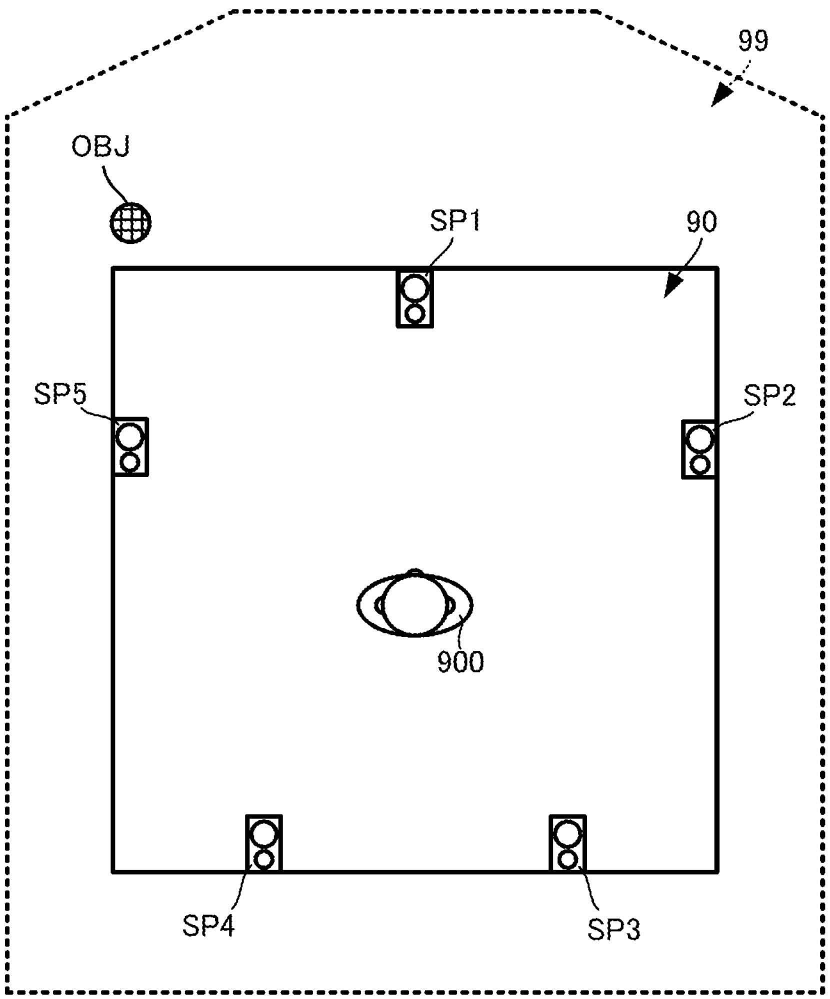
FIG. 8 is a view showing an example of a positional relationship among a sound source, an audience point, a plurality of speakers, and a virtual space in a sound field support method according to the second embodiment of the present disclosure.

FIG. 7 is a functional block diagram showing a configuration of a sound field support system including a sound field support apparatus according to the second embodiment of the present disclosure. FIG. 8 is a view showing an example of a positional relationship among a sound source, an audience point, a plurality of speakers, and a virtual space in a sound field support method according to the second embodiment of the present disclosure.

As shown in FIG. 7, a sound field support apparatus 10A according to the second embodiment is different from the sound field support apparatus 10 according to the first embodiment in that a reverb processor 60 is added. Other configurations of the sound field support apparatus 10A are the same as or similar to the configurations of the sound field support apparatus 10, and a description of the same or similar configurations will be omitted.

The sound field support apparatus 10A includes a reverb processor 60. An object reproduction sound signal and a simulated reproduction sound signal are inputted to the reverb processor 60.

The reverb processor 60 generates an initial reflected sound signal and a reverberant sound signal by use of information on a virtual space 99. The initial reflected sound signal is an audio signal that simulates a sound of the sound source OBJ that is reflected (primary reflection) by a wall of the virtual space and reaches an audience point. The initial reflected sound signal is determined by a geometrical shape of the virtual space, a position of the sound source OBJ in the virtual space, and a position of the audience point. The reverberant sound signal is an audio signal that simulates a sound that is multiply reflected in the virtual space and reaches the audience point. The reverberant sound signal is determined by a geometrical shape of the virtual space, and a position of the audience point in the virtual space.

More specifically, the reverb processor 60 generates an initial reflected sound signal and a reverberant sound signal with respect to an object reproduction sound signal by use of position information on the sound source OBJ, information on the virtual space 99, and position information on the audience point. The reverb processor 60 adds generated initial reflected sound signal and reverberant sound signal to the object reproduction sound signal, and outputs the signals to the selector 40.

In addition, the reverb processor 60 generates an initial reflected sound signal and a reverberant sound signal with respect to a simulated reproduction sound signal by use of the position information on the sound source OBJ, the position information on the speaker SP1 to speaker SP5, the information on the virtual space 99, the position information on the audience point. As a specific example, the reverb processor 60 sets a virtual sound source that represents a generation position of the initial reflected sound to this sound source OBJ in a simulated manner from the position information on the sound source OBJ and the audience point and the information on the virtual space 99. The reverb processor 60 generates an initial reflected sound signal from a positional relationship between this virtual sound source and the speaker SP to which this virtual sound source is assigned. The reverb processor 60 generates a reverberant sound signal by use of a geometrical shape of the virtual space, and a position of the audience point in the virtual space. The reverb processor 60 adds the initial reflected sound signal and reverberant sound signal that have been generated as described above, to a simulated reproduction sound signal, and outputs the signals to the selector 40.

With such a configuration, the sound field support apparatus 10A is able to add each reverb component (an initial reflected sound and a reverberant sound) to an object reproduction sound (a sound from the sound source OBJ) and a simulated reproduction sound (a sound simulated by a speaker) and output the signals. As a result, an audience also takes a reverb component into consideration and can determine accuracy of reproduction of the object reproduction sound by the simulated reproduction sound.

Figure 9:
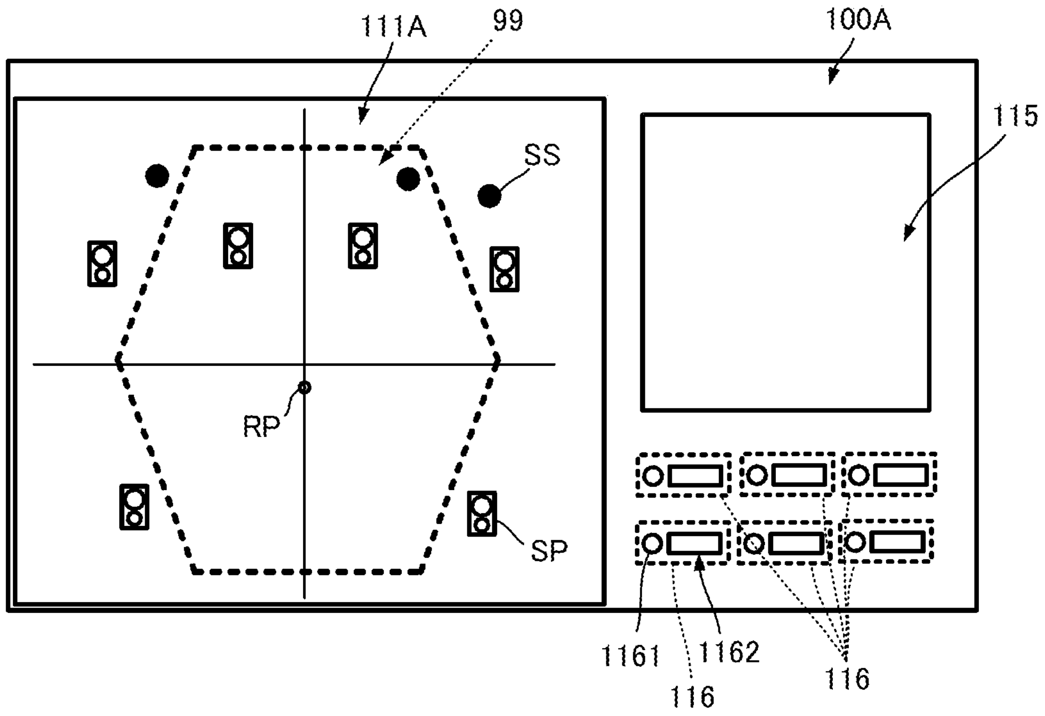
FIG. 9 is a view showing an example of a GUI for adjustment of expansion and a sense of localization of a sound.

Furthermore, the reverb processor 60 is also able to give expansion and a sense of localization to the initial reflected sound signal and reverberant sound signal of the simulated reproduction sound signal. In this case, the audience can perform adjustment by use of the GUI as shown in FIG. 9, for example. FIG. 9 is a view showing an example of a GUI for adjustment of expansion and a sense of localization of a sound. As shown in FIG. 9, a GUI 100A includes a setting display window 111A, an output state display window 115, and a plurality of physical controllers 116. The plurality of physical controllers 116 include a knob 1161 and an adjustment value display window 1162.

The setting display window 111A displays a virtual sound source SS set to the sound source OBJ, a plurality of speakers SP, a virtual space 99, and an audience point RP by a position coordinate set for each.

The plurality of physical controllers 116 are physical controllers to set weight volume that sets a weight value, shape volume that sets a shape value, and the like. Each of the physical controllers 116 for weight volume includes a physical controller 116 to set left-right weight, front-rear weight, and up-down weight, and includes a physical controller to set a gain value, and a physical controller to set a delay amount. The physical controllers 116 for shape volume include a physical controller to set expansion, and includes a physical controller to set a gain value, and a physical controller to set a delay amount. An audience can adjust expansion and a sense of localization of a sound by operating the plurality of physical controllers 116.

The output state display window 115 graphically and schematically displays expansion and a sense of localization of a sound that are obtained by the weight value and the shape value that are set by the plurality of physical controllers 116. Accordingly, an audience can easily recognize expansion and a sense of localization of a sound that are set by the plurality of physical controllers 116, as an image. It is to be noted that, in a case in which the audience listens to a sound on which the binaural processing has been performed, by the headphones 80, the output state display window 115 can also combine and display an image showing a head, and an image showing expansion and a sense of localization of a sound in accordance to the image of a head.

As a result, an audience also takes expansion and a sense of localization of a sound into consideration and can determine accuracy of reproduction of the object reproduction sound by the simulated reproduction sound.

It is to be noted that, for example, the audience can also adjust a shape of the virtual space 99, a position to a reproduction space, a position of the sound source OBJ, and a position of the plurality of speakers SP by operating the setting display window 111A. In this case, the sound field support apparatus, according to various kinds of adjusted content, generates an object reproduction sound signal and a simulated reproduction sound signal and performs similar reverb processing. As a result, the audience, even after adjustment, can determine accuracy of reproduction of the object reproduction sound by the simulated reproduction sound.

(Sound Field Support Method of Second Embodiment)

Figure 10:
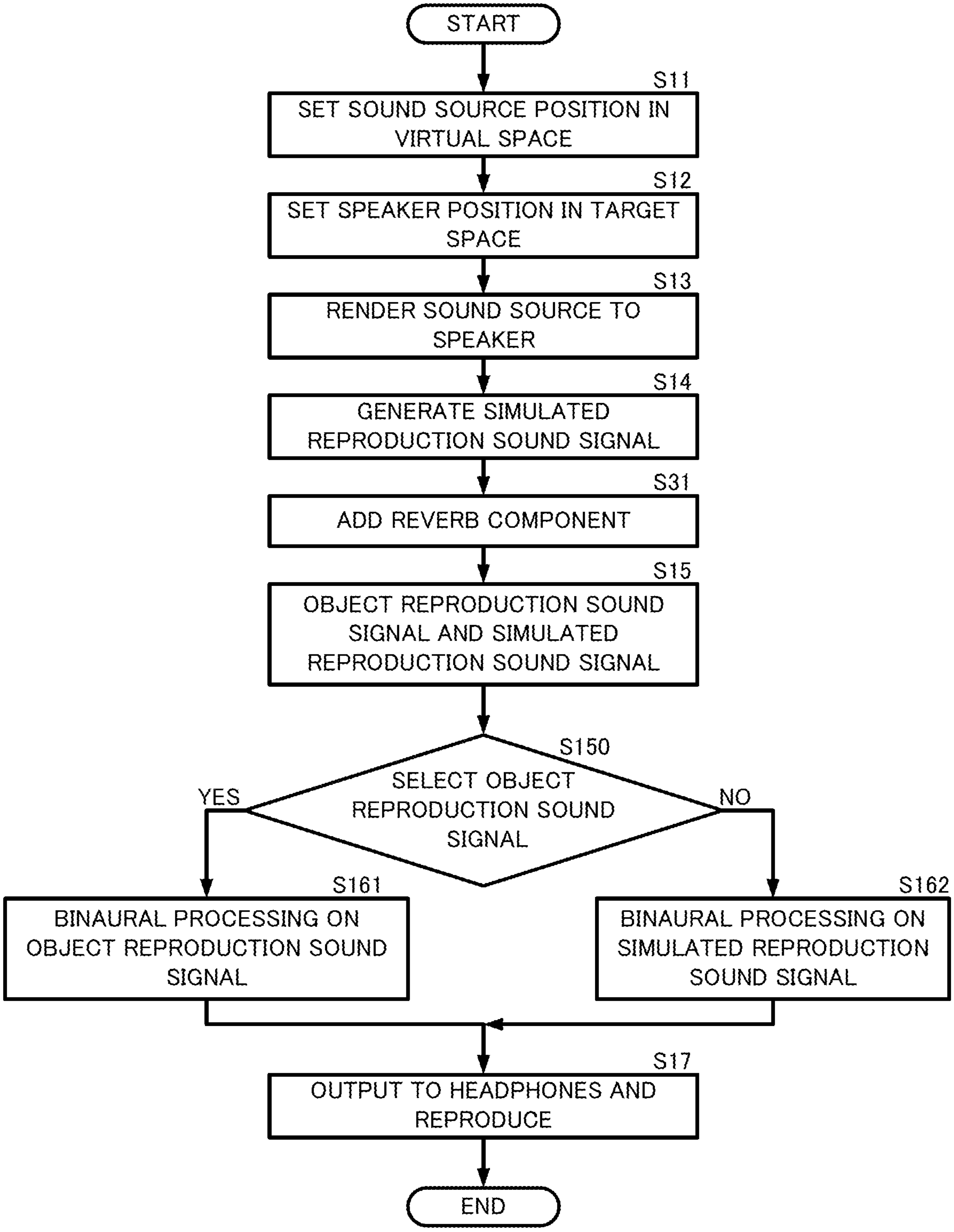
FIG. 10 is a flow chart showing a sound field support method according to the second embodiment of the present disclosure.

FIG. 10 is a flow chart showing a sound field support method according to the second embodiment of the present disclosure. The sound field support method shown in FIG. 10 adds processing to add a reverb component to the sound field support method shown in FIG. 4. It is to be noted that a description of processing that is the same as the processing shown in FIG. 4 in each processing shown in FIG. 10 will be omitted.

The sound field support method shown in FIG. 10 executes the same processing up to Step S14 as the sound field support method shown in FIG. 4.

The reverb processor 60 generates a reverb component (an initial reflected sound signal and a reverberant sound signal) with respect to an object reproduction sound signal and a simulated reproduction sound signal, and adds the reverb component to the object reproduction sound signal and the simulated reproduction sound signal (S31).

The sound field support apparatus 10A executes processing after Step S15 by use of the object reproduction sound signal to which the reverb component is added and the simulated reproduction sound signal to which the reverb component is added.

As a result, the sound field support method according to the second embodiment of the present disclosure is able to add each reverb component (an initial reflected sound and a reverberant sound) to the object reproduction sound (the sound from the sound source OBJ) and the simulated reproduction sound (the sound simulated by a speaker) and output the signals. As a result, an audience also takes a reverb component into consideration and can determine accuracy of reproduction of the object reproduction sound by the simulated reproduction sound.

Third Embodiment

Figure 11:
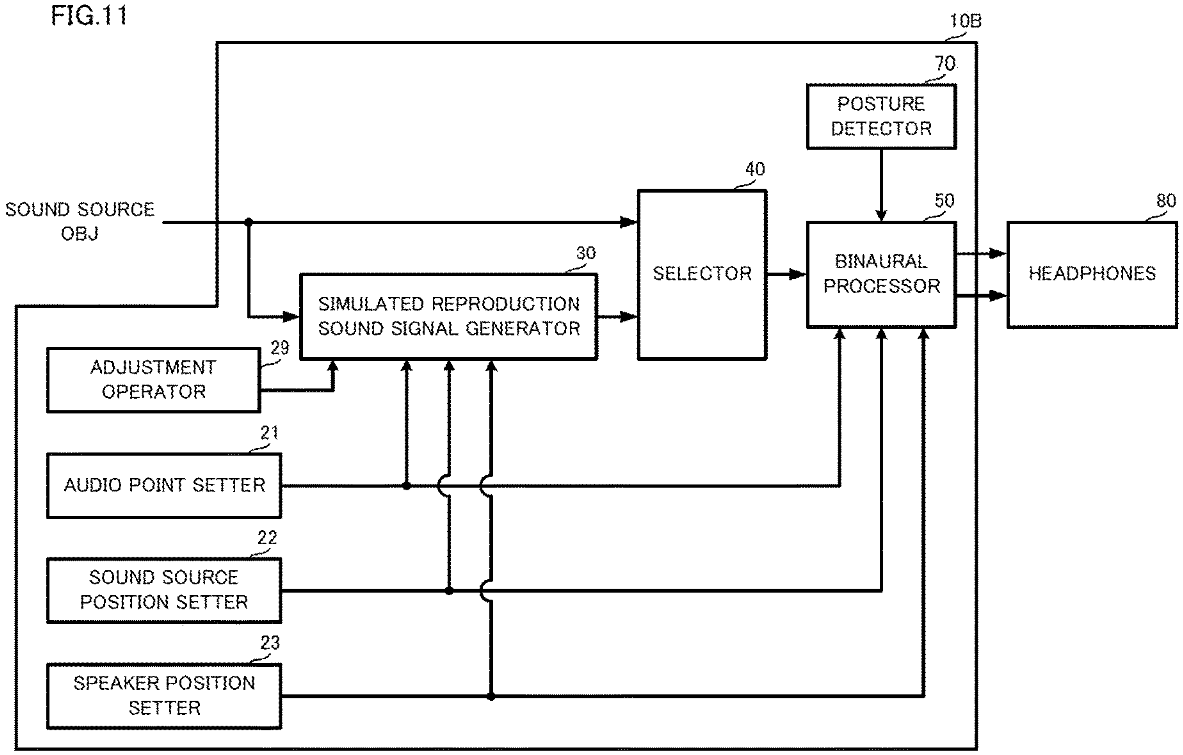
FIG. 11 is a functional block diagram showing a configuration of a sound field support system including a sound field support apparatus according to a third embodiment of the present disclosure.

A sound field support apparatus and a sound field support method according to a third embodiment of the present disclosure will be described with reference to the drawings. FIG. 11 is a functional block diagram showing a configuration of a sound field support system including a sound field support apparatus according to the third embodiment of the present disclosure.

As shown in FIG. 11, a sound field support apparatus 10B according to the third embodiment is different from the sound field support apparatus 10 according to the first embodiment in that a posture detector 70 is added. Other configurations of the sound field support apparatus 10B are the same as or similar to the configurations of the sound field support apparatus 10, and a description of the same or similar configurations will be omitted.

The posture detector 70 is attached to the head of an audience and detects the posture of the head of an audience. For example, the posture detector 70 is a posture detection sensor of three orthogonal axes, and is attached to the headphones 80. The posture detector 70 outputs detected posture of the head of the audience to the binaural processor 50.

The binaural processor 50 performs the binaural processing on the object reproduction sound signal and the simulated reproduction sound signal by use of a posture detection result of the head of the audience, that is, a direction of the face of the audience.

As a result, the sound field support apparatus 10B is able to reproduce the object reproduction sound and the simulated reproduction sound according to the direction of the face of the audience. Accordingly, the audience, while changing the direction of the face in the target space, can compare and listen to the object reproduction sound and the simulated reproduction sound according to the direction of the face. Therefore, the audience can directly and physically experience a difference between the object reproduction sound and the simulated reproduction sound in a plurality of directions in the target space. Accordingly, the audience can determine whether the simulated reproduction sound is able to reproduce (simulate) the object reproduction sound with good accuracy, or no discomfort between the object reproduction sound and the simulated reproduction sound is caused. In addition, as a result, the audience can reproduce the object reproduction sound by the simulated reproduction sound with better accuracy.

(Sound Field Support Method of Third Embodiment)

Figure 12:
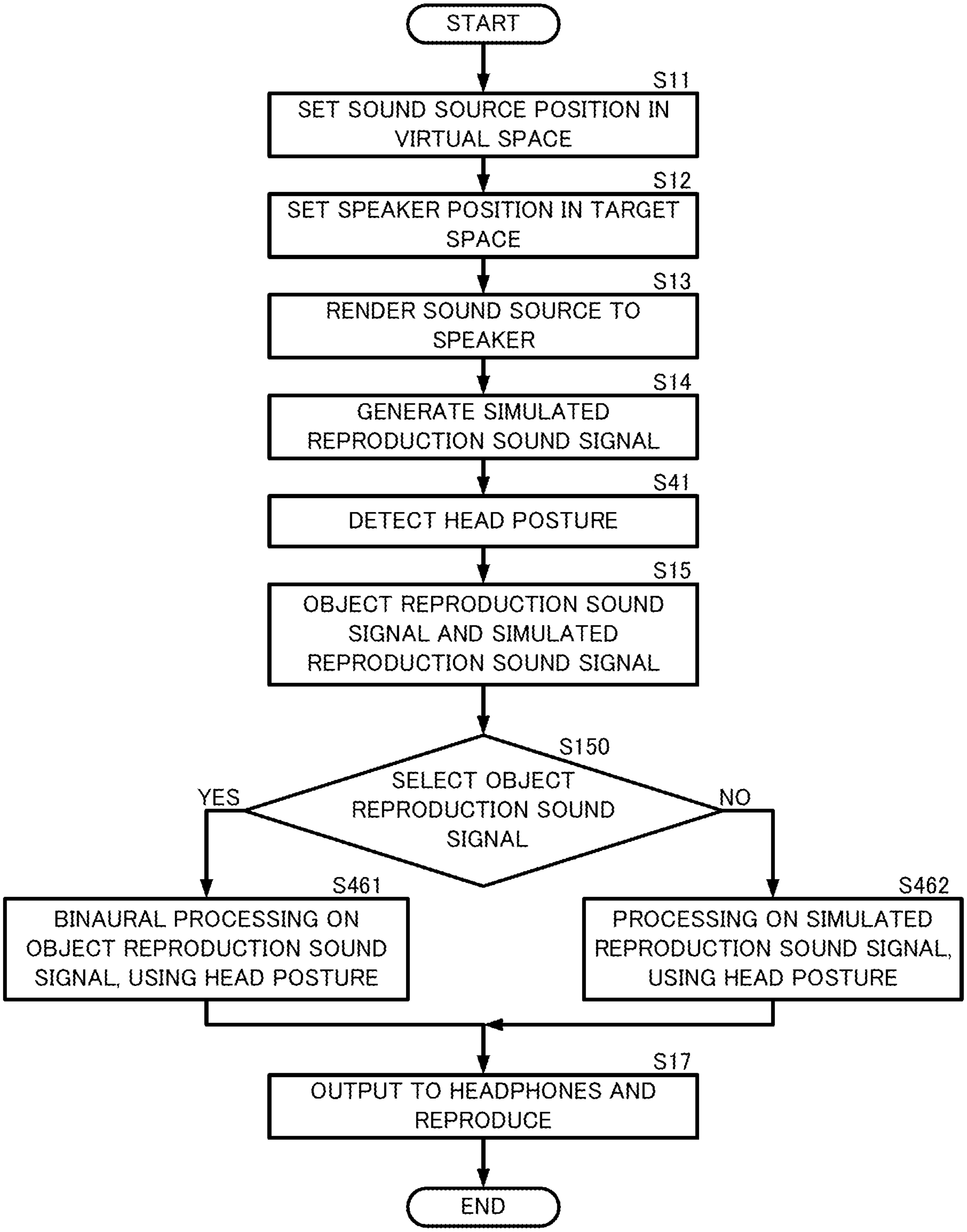
FIG. 12 is a flow chart showing a sound field support method according to the third embodiment of the present disclosure.

FIG. 12 is a flow chart showing a sound field support method according to the third embodiment of the present disclosure. The sound field support method shown in FIG. 12 includes processing related to head posture detection in addition to the sound field support method shown in FIG. 4. It is to be noted that a description of processing that is the same as the processing shown in FIG. 4 in each processing shown in FIG. 12 will be omitted.

The sound field support method shown in FIG. 12 executes the same processing up to Step S14 as the sound field support method shown in FIG. 4.

The posture detector 70 detects a posture of the head of an audience (S41).

The selector 40 selects the object reproduction sound signal and the simulated reproduction sound signal by an operation from an audience or the like (S15).

When the object reproduction sound signal is selected (YES in S150), the binaural processor 50 performs the binaural processing on the object reproduction sound signal by use of detected head posture (S461). When the simulated reproduction sound signal is selected (NO in S150), the binaural processor 50 performs the binaural processing on the simulated reproduction sound signal by use of the detected head posture (S462).

The sound field support apparatus 10B executes processing of Step S17 by use of the audio signal on which the binaural processing has been performed.

As a result, the sound field support method according to the third embodiment of the present disclosure is able to output an object reproduction sound and a simulated reproduction sound according to the direction of the face of an audience. Accordingly, the audience, while changing the direction of the face in the target space, can compare and listen to the object reproduction sound and the simulated reproduction sound according to the direction of the face. Therefore, the audience can directly and physically experience a difference between the object reproduction sound and the simulated reproduction sound in a plurality of directions in the target space. Then, the audience can determine whether the simulated reproduction sound is able to reproduce (simulate) the object reproduction sound with good accuracy, or no discomfort between the object reproduction sound and the simulated reproduction sound is caused. In addition, as a result, the audience can reproduce the object reproduction sound by the simulated reproduction sound with better accuracy.

It is to be noted that the configuration and processing of each embodiment described above is able to be properly combined, and advantageous functional effects according to each combination are able to be obtained.

In addition, the descriptions of the embodiments of the present disclosure are illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

What is claimed is:

1. A sound field support method for an audio reproducing apparatus for simulating sound emitting from a sound source, the method comprising:

selecting either position information on the sound source to be set in a virtual space or localization information of the sound source, in a case where sound from the sound source is to be simulated by sound emitted from a speaker to be set in a target space;

generating a first sound signal based on the position information in a state where the selecting has selected the position information;

generating a second sound signal based on the localization information in a state where the selecting has selected the localization information; and adjusting sound image localization of an input audio signal from the sound source to be output to the speaker using the first sound signal and the second sound signal.

2. The sound field support method according to claim 1, further comprising:

comparing the first sound and the second sound signal, wherein the adjusting adjusts the sound image localization of the input audio signal based on a result of the comparing.

3. The sound field support method according to claim 1, further comprising:

adding an initial reflected sound signal or a reverberant sound signal to the first sound signal and the second sound signal.

4. The sound field support method according to claim 1, further comprising:

setting an audience position in the target space;

performing binaural processing to the input audio signal based on the position information or the localization information, and the audience position; and outputting a reproduction sound signal to which the binaural processing has been performed to the input audio signal.

5. The sound field support method according to claim 4, further comprising:

setting a direction of a face of an audience at the audience position, wherein the binaural processing is adjusted based on the direction of the face in addition to the position information or the localization information, and the audience position.

6. A sound field support apparatus comprising:

a memory storing instructions; and a processor that implements the instructions to execute a plurality of tasks, including:

a selecting task that selects either position information on a sound source to be set in a virtual space or localization information of the sound source, in a case where sound from the sound source is to be simulated by sound emitting from a speaker to be set in a target space;

a generating task that generates:

a first sound signal based on the position information in a state where the selecting task has selected the position information is selected; and a second sound signal based on the localization information in a state where the selecting task has selected the localization information; and an adjusting task that adjusts sound image localization of an input audio signal from the sound source to be output to the speaker using the first sound signal and the second sound signal.

7. The sound field support apparatus according to claim 6, wherein the adjusting task:

compares the first sound signal and the second sound signal; and adjusts the sound image localization of the input audio signal based on result of the comparison.

8. The sound field support apparatus according to claim 6, wherein the plurality of tasks include:

a reverb processing task that adds an initial reflected sound signal or a reverberant sound signal to the first sound signal and the second sound signal.

9. The sound field support apparatus according to claim 6, wherein the plurality of tasks include:

an audience point setting task that sets an audience position in the target space; and a binaural processing task that:

performs binaural processing to the input audio signal based on the position information or the localization information, and the audience position; and outputs a reproduction sound signal to which the binaural processing has been performed to the input audio signal.

10. The sound field support apparatus according to claim 9, further comprising:

a posture detector that detects a direction of a face of an audience at the audience position, wherein the binaural processing task adjusts the binaural processing based on the direction of the face in addition to the position information or the localization information, and the audience position.

11. A non-transitory computer-readable storage medium storing a program executable by a computer to execute a sound field support method for an audio reproducing apparatus for simulating sound emitting from a sound source, the method comprising:

selecting either position information on the sound source to be set in a virtual space or localization information of the sound source, in a case where sound of the sound source is to be simulated by sound emitted from a speaker to be set in a target space;

generating a first sound signal based on the position information in a state where the selecting has selected the position information;

generating a second sound signal based on the position information in a state where the selecting has selected the localization information; and adjusting sound image localization of an input audio signal from the sound source to be output to the speaker using the first sound signal and the second sound signal.

* * * * *